United States Patent Office 3,497,366
Patented Feb. 24, 1970

3,497,366
GLASS, CERAMIC AND METHOD
George A. Simmons, Toledo, Ohio, assignor to Owens-Illinois, Inc., a corporation of Ohio
No Drawing. Filed July 13, 1966, Ser. No. 564,753
Int. Cl. C04b *35/00, 35/14*
U.S. Cl. 106—39　　　　　　　　　　　9 Claims

ABSTRACT OF THE DISCLOSURE

Disclosed are thermally crystallizable glass compositions having a liquidus temperature below 2450° F. and containing $SiO_2$, $Al_2O_3$, $Li_2O$, CaO, MgO, $TiO_2$, $ZrO_2$, and ZnO; a method of thermally crystallizing such glasses; partially crystalline ceramics having a coefficient of expansion in the range $30$–$60 \times 10^{-7}/°$ C. made by thermally crystallizing such glasses.

---

This invention relates to new glass compositions capable of being thermally crystallized to strong partially crystalline ceramics. In another aspect, the present invention pertains to such strong semi-crystalline ceramic products and to methods for their production.

Certain types of semi-crystalline ceramic materials are known in the art and are widely used in various industrial and scientific applications. For instance certain semi-crystalline ceramic materials find particular utility in cooking vessels such as baking dishes, fry pans, and coffee pots, due to their chemical durability and thermal stability. In these and other applications high flexural strength is a very desirable property.

In U.S. Patent 3,117,881 to Kenneth M. Henry and William E. Smith, patented Jan. 14, 1964, there is disclosed a family of glass-ceramics made by thermal in situ crystallization of glass, which ceramics have generally high flexural strengths. However, these ceramics in general have relatively high coefficients of thermal expansion and their resistance to damage by thermal shock is therefore somewhat limited by this property. Also, these high strength glass-ceramics are very high melting and have generally high liquidus temperatures. In co-pending application Ser. No. 352,998 by William E. Smith, filed Mar. 18, 1964, now U.S. Patent 3,380,818, and printed Dutch application 65/3,460, there is disclosed a family of ceramics made by in situ crystallization of glass which have excellent thermal shock resistance because of their low coefficients of expansion. While this family of ceramics have very good flexural strengths compared to ordinary ceramics and other known low expansion ceramics made by in situ crystallization of glass, it is desirable for many uses to have even stronger glass-ceramics. In co-pending application, Ser. No. 410,016 by Richard W. Petticrew filed Nov. 9, 1964, there is disclosed a family of ceramics having good flexural strengths resulting from the crystallization of glass compositions containing less than about 2% $Li_2O$ and up to 1% ZnO by weight.

In view of the foregoing it is therefore an object of the present invention to provide new thermally crystallizable glasses containing more than about 2% $Li_2O$ which are relatively easy to melt from batch materials and are capable of being thermally in situ crystallized to high strength partially crystalline ceramic materials.

It is a further object of the present invention to provide new partially crystalline ceramic materials and a method of making them.

It is another object of the present invention to provide a new ceramic material possessed of good chemical durability, good forming properties in addition to being capable of withstanding thermal shock differentials of 300° F. and greater.

Other objects, features and advantages of the present invention will become apparent to those skilled in the art from a reading of the following description and claims.

According to the present invention there is provided a thermally crystallizable glass composition composed of at least 90% by weight $$SiO_2 + Al_2O_3 + Li_2O + CaO + MgO + TiO_2 + ZrO_2 + ZnO$$

said glass composition containing the following components in the indicated range.

| Component | Percent by Weight | |
|---|---|---|
| | Broad Range | Narrow Range |
| $SiO_2$ | 60–66 | 63–65 |
| $Al_2O_3$ | 12–18 | 14–16 |
| MgO | 4–7 | 4–7 |
| CaO | 4–7 | 4–7 |
| $Li_2O$ | 1.5–4 | 2.2–3 |
| $TiO_2$ | 1.5–6 | 2–5 |
| $ZrO_2$ | 0.5–3 | 0.5–2 |
| ZnO | 2–5 | 2–4 |
| (MgO+CaO) | 8–13 | 9–12 |

An especially useful range within the narrow range set forth above are the compositions 63–65% $SiO_2$, 14–16% $Al_2O_3$, 5% MgO, 5% CaO, 2.5–3% $Li_2O$, 4% $TiO_2$, 1% $ZrO_2$ and 3% ZnO.

The glasses of the present invention consist essentially of the components of the foregoing paragraph in the indicated ranges, but small amounts of other compatible glass forming components such as inorganic oxides and halides can be included; e.g., up to about 3% BaO or SrO, up to about 4% $B_2O_3$ or $P_2O_5$, or F (of course F is present in combined form as a fluoride), and small amounts of colorants such as NiO and CoO, etc.

When the present glasses are crystallized by thermal treatment, a multitude of crystals are formed in situ throughout the body, and these are randomly dispersed in the residual glassy matrix. These crystals make the body decidedly more refractory and resistant to thermal deformation. Such crystals are essentially all less than 30 microns across in their largest lineal dimension.

The crystalline body is exceptionally strong having high flexural strength. The lineal coefficient of thermal expansion of such bodies is usually in the range of $30$–$60 \times 10^{-7}/°$ C. over the temperature range of from 0 to 300° C. While the precise explanation for the high flexural strength is not known, it has been found that the bodies have a multiplicity of crystalline species randomly dispersed throughout. It is theorized that these various crystalline species interact to produce the unexpected strength increase. Furthermore, this strengthening effect is not strictly a surface phenomenon as evidenced by the surprising modules of rupture (flexural strength) of the test pieces, after severe abrasion. Whatever the cause of this unexpected strength increase, it is known to depend on the critical amounts of constituents set forth above.

A further advantage of the present glasses from the practical standpoint is that they have generaly liquidus temperatures below 2450° F., and can therefore be handled in commercial equipment without present danger of devitrification in cold spots in the furnace. For automatic pressing and automatic blowing operations, it is desirable to have a glass whose liquidus temperature is not more than 200° F. above the temperature at which the logarithm of the viscosity in poises is 4, preferably not more than 100° F.; also, in order to have reasonable operating temperatures in the forehearth and feeder of the furnace, and to have a not too severe temperature when the glass initially contacts the molds, it is preferred that this log 4 temperature not exceed 2450° F. The log 4 viscosity of the instant glasses is, generally, below 2450° F. .

The glasses of the present invention can be melted by conventional means such as gas fired furnaces, or electric ovens and the like. The melting vessel can be platinum or other suitable refractory material such as fused silica and the like. The melting is usually accomplished by heating the batch materials at temperatures of 2600–3000° F. with stirring for sufficient time to assure homogeneity. The glass is thereafter formed by conventional means such as press molding, casting, blow molding, tube drawing, or the like. Useful shapes and objects are easily formed in this manner, such as tableware, cooking ware, such articles as plates, cups and saucers can be made by pressing in a mold or by blow molding techniques.

In any event, the method of the invention comprises treating the formed glass object which has been cooled down to about its annealing point or lower, in an initial low temperature heat treatment range to form many nuclei or crystallites, and thereafter heating at a higher temperature to complete the crystallization to the desired degree.. The optimum heat treatment schedule depends, as will be understood, on the particular glass compositioin and its tendency to form nuclei, the rate of formation of nuclei and the rate of crystallization. Therefore, it is not possible to specify a heat treatment schedule that will be common to all the glasses of the invention.

However, it is usually preferred that the first-mentioined low temperature heat treatment be in a range of temperatures which promotes a high rate of formation of nuclei or crystallites, wherein "nuclei" are defined as submicroscopic precursors or crystalline species or a finely dispersed submicroscopic immiscible glassy phase. The "high rate" of nuclei formation employed in a given instance is not necessarily the highest absolute rate of nuclei formation, but, nevertheless, the initial "nuclei-forming" heat treatment temperature is chosen so that the rate of nuclei formation is high relative to the rate of crystal growth at the chosen temperature. The mechanism of crystal initiation for the present glasses is not definitely known, nor is it known whether the first phase that separates during the crystallization heat treatment schedule is an immiscible glassy phase or is a separate crystallite or crystalline phase. Also, it is difficult to measure directly the range of temperatures in which the high rates of nuclei formation occur, or in other words, where the optimum temperature range for the initial heat treatment is to be located. However, this temperature range usually is in the range from 30° F. below the annealing point of the glass to 250° or 300° F. above the annealing point. The annealing point, as defined herein, can be determined by ASTM designation C 336–54T, with the testing apparatus being calibrated using fibers of standard glasses having known annealing and strain points as specified and published by the National Bureau of Standards.

While the temperature range for high rates of nuclei formation is difficult to measure directly, the optimum initial low temperature heat treatment range can be empirically determined employing small droplets of the glass and a micro-furnace capable of very rapid temperature change and accurate temperature control. A droplet of the glass, cooled to below the annealing point temperature, can be rapidly heated in the micro-furnace to a specific temperature, say, between 30° F. below the annealing point and 250° F. above the annealing point, and held at such temperature for a specified time interval, the length of time of heating depending, again, upon the particular glass. Thus, if the glass inherently very rapidly forms nuclei, a shorter standard time at the low temperature can be used than if the nuclei are relatively only slowly formed. In any event, as an example, a droplet of the glass can be heated for, say 15 minutes at 60° F. above the annealing point temperature. Thereafter the droplet of glass in the micro-furnace can be very rapidly heated to a predetermined crystallization temperature, for instance, to a suitable temperature within the range 1600°–1900° F., and held at such predetermined temperature for a specific length of time, for instance, one-half hour. This process can be repeated, using the same length of time of initial and final heating and the same temperature of final heating, but using different initial heating temperatures, say 40°, 80°, 100°, and 120° F. above the annealing point temperatures. Thereafter, by microscopic examination, one can determine which initial heat treatments resulted in formation of the most and smallest crystals, and thus determine the approximate temperature range where a maximum number of crystallization centers are formed. Thereafter, an optimum heat treatment schedule can be worked out by varying the length of time in the initial heat treatment range that appears to be optimum and by varying time and temperatures of heating in the final crystallization heat treatment range. Properties such as the fineness of the crystals and the strength of samples treated according to varioius temperature schedules can be determined as an aid in selecting an optimum heat treatment schedule for the properties desired.

The process of the invention thus usually comprises heat treating the formed article in an optimum initial temperature range between 30° F., below the annealing point and about 250° F. or 300° F. above the annealing point for a time of at least one-half hour, usually at least one hour, and thereafter heat treating in a higher crystallization temperature range. Where deformation or slumping is a problem, it is usually necessary that the initial heat treatment include at least a one-half hour period at a temperature not over about 175° to 200° F. above the annealing point temperature. The time of initial heat treatment in the range from 30° F. below to 300° F. above the annealing point has no upper limit; usually it is not more than 5 or 6 hours, but longer times are not usually in the least harmful. In fact, in heat treating thick articles it is often advantageous to use very long times up to a day or a week or more at the lower temperatures in this range, in order to obtain more uniform treatment throughout the thickness of the article.

The crystallization heat treatment stage is effected at higher temperatures, usually in the range from about 1500–2000° F., with a sufficient length of time of heating in the high temperature range to effect in situ crystallization to at least the extent that the resulting glass-ceramic product, after cooling to room temperature and reheating, will not substantially deform under its own weight when held for one hour at a temperature 300° F. above the annealing point of the original glass. Thus, a rod, 5 inches long and ¼ inch in diameter supported near each end by knife edges spaced 4 inches apart will not deform or sag at the center under such conditions as much as ¼ inch. Obviously, a degree of crystallization that passes this test represents a rather highly crystalline material, since glass or glass with only around 5% crystalline material would obviously deform badly when held at a temperature so far above its annealing point. However, it is not possible to determine the exact relative amounts of crystalline and vitreous material in such densely crystallized materials as are produced by the present invention. Generally, times of heating in the temperature range of 1500 to 2000° F., are from 15 minutes to 6 hours, usually from ½ to 4 hours. Again, however much longer times can be employed in lower temperature ranges to obtain very uniform crystallization.

In any event, the overall heat treatment and the crystallization heat treatment, effected at the higher temperature, results in an at least partially crystalline ceramic body whose entire interior contains a multitude of randomly oriented, substantially homogeneously dispersed crystals, essentially all of which crystals are in their largest lineal dimension less than 30 microns across. The products are densely crystallized hard, and non-porous.

As will be understood, when going from the initial or nucleation heat treatment temperature to the higher crystallization temperature, it is usually preferred to proceed slowly enough, or to stop at intermediate plateaus long enough, to effect appreciable crystallization in the intermediate temperature range, at least to such a degree that a sufficiently rigid crystalline network is formed that prevents the article from slumping. Of course, in heat treating articles such as flat plates that can be cast in a mold and heat treated in the mold, the slumping problem is not important and not as much care need be exercised.

Although the specific examples shown hereafter in Table II show several plateaus of heat treatment temperatures, the entire heat treatment can be effected using slowly and continuously rising temperatures, and it is often desirable to employ different heating rates at various stages of the heating process. For instance, in the nucleation heat treatment temperature range the heating rate is usually slower than when going from this lower temperature range to the final crystallization temperature range.

The glasses of the invention can be melted in the normal manner in gas-fired furnaces, preferably using slightly oxidizing conditions, or in electric furnaces. Electric boosting can be provided in gas-fired furnaces where desired. In the laboratory platinum crucibles can be used. In larger furnaces high quality refractories are employed, such as high-alumina refractories. When employing alumina refractories, it must be remembered that some alumina may enter the composition from the refractories, the amount depending in part upon the volume of charge in relation to the surface area of the furnace, temperature, length of time of melting, etc. Some adjustment in the batch composition may be necessary to account for the alumina from the refractory.

EXAMPLE I

In a typical example of the invention the following batch materials were melted at a glass temperature of about 2700–2800° F. in a platinum crucible in a gas fired furnace using slightly oxidizing conditions. Melting time was about 25 hours with mechanical stirring. The batch is shown in Table I, while the corresponding composition and properties are shown in Table II.

A number of rods were pulled from the homogeneous glass melt, and the rods were thermally crystallized in situ after cooling, using the approximate heat treatment schedule shown below—

| Degrees F.: | Hours |
| --- | --- |
| 1200 | 2 |
| 1450 | 2 |
| 1900 | 1 |

The rods were slowly cooled in the furnace by simply shutting off the power. The rods were opaque white in appearance. A thin (0.001 inch in thickness) cross sectional piece of the cooled rod was observed under a petrographic microscope at 80× magnification. No difference was observed in texture or light transmission properties in the surface of the test piece as compared to the bulk of the cross section.

X-ray diffraction data indicates that the following crystalline species are present:

Major crystalline phases:
  β-spodumene-($Li_2O \cdot Al_2O_3 \cdot 4SiO_2$)
  Diopside ($CaO \cdot MgO \cdot 2SiO_2$)
Minor crystalline phases:
  Sapphirine ($4MgO \cdot 5Al_2O_3 \cdot 2SiO_2$)
  Rutile ($TiO_2$)
Trace amounts present:
  Zirconia ($ZrO_2$)
  ZnO The average abraded modulus of rupture (flexural strength) was 43,000 p.s.i. The modulus of rupture determination was carried out as will be described hereinafter. Other properties of the glass and of the ceramic produced by the foregoing heat treatment are set forth in Table II.

The following Table II also sets forth exemplary compositions of glasses and resulting in situ crystallized ceramics of invention having the properties of the ceramics of the invention set forth hereinbefore, which glasses were melted in a manner similar to preceding example. Heat treatment schedules are given and the modulus of rupture value were determined and are set forth in the table. In the table the symbol MR stands for modulus of rupture (flexural strength). Table I sets forth the batch materials for several of the compositions shown in Table II.

TABLE I

Batch Materials for Exemplary Compositions in Parts by Weight (about 10 lb. melts)

| Material | Ex. I, gms. | Ex. II, gms. | Ex. IV, gms. | Ex. V, gms. | Ex. VI, gms. |
| --- | --- | --- | --- | --- | --- |
| Ottawa Flint [1] | 1,862.7 | 2,107.9 | 1,821 | 1,814.8 | 1,830.2 |
| Alundum [2] | 192.9 | 285.7 | 458 | 192.9 | 192.9 |
| Magnesium Oxide | | | 94 | | |
| Dolomite (burned) | 433.7 | 433.7 | 517 | 433.7 | 433.7 |
| Florida Zircon | 75.8 | 75.8 | 90 | 75.8 | 75.8 |
| Petalite | | | 2600 | | |
| Titanox [3] | 201.0 | 201.0 | 238 | 201.0 | 201.0 |
| Zinc Oxide | 150.0 | 150.0 | 179 | 150.0 | 150.0 |
| Spodumene | 2,040.8 | 1,700.7 | | 2,040.8 | 2,040.8 |
| Michigan Periclase [4] | 83.1 | 83.1 | | 135.4 | 109.2 |

[1] Powdered Flint, that is 99.9% $SiO_2$, that passes through a 200-mesh screen, supplied by Ottawa Silica Co.
[2] Powdered $Al_2O_3$.
[3] Substantially pure $TiO_2$.
[4] Dead-burned periclase supplied by Harbison-Walker Refractories Co., from its Ludington, Michigan plant as a source of MgO.

TABLE II

Composition and Properties of Exemplary Compositions

| Constituent Percent: | Ex. I | Ex. II | Ex. III | Ex. IV | Ex. V | Ex. VI |
| --- | --- | --- | --- | --- | --- | --- |
| $SiO_2$ | 64.0 | 64.5 | 64.2 | 65.0 | 63.0 | 63.5 |
| $Al_2O_3$ | 15.0 | 15.0 | 15.0 | 15.0 | 15.0 | 15.0 |
| $Li_2O$ | 3.0 | 2.5 | 2.8 | 2.0 | 3.0 | 3.0 |
| MgO | 5.0 | 5.0 | 5.0 | 5.0 | 6.0 | 5.5 |
| CaO | 5.0 | 5.0 | 5.0 | 5.0 | 5.0 | 5.0 |
| ZnO | 3.0 | 3.0 | 3.0 | 3.0 | 3.0 | 3.0 |
| $ZrO_2$ | 1.0 | 1.0 | 1.0 | 1.0 | 1.0 | 1.0 |
| $TiO_2$ | 4.0 | 4.0 | 4.0 | 4.0 | 4.0 | 4.0 |
| Liquidus, ° F. | 2120 | 2095 | 2115 | 2250 | 2120 | 2130 |
| Log 4η, ° F. | 2060 | 2050 | 2060 | 2330 | 1955 | 2030 |
| Annealing point, ° F. | 1160 | | | | 1145 | 1145 |
| $\alpha \times 10^7$/° C. (25–300° C.) of the glass | | 44 | 45 | | | |
| $\alpha \times 10^7$/° C. (25–300°C.) of the semi-crystalline ceramic | | | 55 | | | |
| Heat treatment (° F./hours) | 1200/2 1450/2 1900/1 | 1320/2 1520/2 1850/1 | 1300/2 1450/2 1950/1 | 1400/1 1450/1 1800/1 | 1200/4 1450/1 1900/1 | 1200/4 1450/1 1900/1 |
| Modules of rupture p.s.i./1000 (abraded) | 43 | 36 | 55 | 30 | 43 | 35 |

In Table I, the annealing points are shown for only a few of the examples. However, enough annealing points were determined to know that the heat treatment schedules were in accordance with the usual ranges set forth in the previous discussion of the method of crystallization. The annealing points which were determined and are shown were not determined by the precise ASTM method, and are therefore only approximate. They were, however, accurate enough to serve as a guide for establishing the heat treatment schedules. Also, while the liquidus temperatures shown were carefully determined by a fairly precise method employing platinum boats in a gradient furnace, they are not as precise as the quenching and melting methods used for the most careful phase diagram work. Also, the values given for the temperature at which the logarithm of the viscosity of the glass in poises is 4, are values extrapolated from higher temperatures and so are subject to some experimental error. However, viscosities and other measured properties are reported in the table so that those skilled in the art will have a fuller understanding of the general working properties of the present glasses.

The tested flexural strength of the crystallized material was determined using crystallized cane samples, usually of about 0.20 inch in diameter, and in all cases from 0.15 to 0.5 inch in diameter. The modulus of rupture tests were made using a Tinius-Olsen testing machine. This machine applies a measured load through a single knife edge to the center of a 4 inch long sample of cane supported on two knife edges (3-point loading). The load is applied at a constant rate of 24 pounds per minute until failure occurs, with a marker indicating the highest load applied to the point of failure. Before the cane samples are tested they are abraded uniformly by rotating in a slow-speed drill press in contact with 320-grit emery paper under hand pressure. This technique assures that the abrasions are parallel to the direction of loading. A dial micrometer calibrated in inches and equipped with a bar contact instead of a point contact is used to measure maximum and minimum diameters at the center of the sample to an accuracy of 0.0005 inch. Since few cane samples are perfectly round, the load is applied normal to the maximum diameter and the standard formula for an elliptical cross-section is used in calculating the modulus of rupture as follows:

$$MR = \frac{\text{Load (lbs.)} \times 8 \times \text{span (in.)}}{(D_1^2 \times D_2)\pi}$$

Each value reported in Table I is the average of a number of cane samples so tested.

As will be evident to those skilled in the art, modifications of this invention can be made or followed in the light of the foregoing disclosure without departing from the spirit and scope of the disclosure or from the scope of the claims.

I claim:
1. A thermally crystallizable glass composition having a liquidus temperature below 2450° F. and consisting essentially of the following components, present in the glass in the indicated weight percentage ranges—

| Component: | Percent by weight |
|---|---|
| $SiO_2$ | 60–66 |
| $Al_2O_3$ | 12–18 |
| MgO | 4–7 |
| CaO | 4–7 |
| $Li_2O$ | 1.5–4 |
| $TiO_2$ | 1.5–6 |
| $ZrO_2$ | 0.5–3 |
| ZnO | 2–5 |
| (MgO+CaO) | 8–13 | said glass consisting of at least 90 weight percent $SiO_2$+$Al_2O_3$+$Li_2O$+CaO+MgO+$TiO_2$+$ZrO_2$+ZnO.

2. The glass of claim 1, wherein the composition is in the range—

| Component: | Percent by weight |
|---|---|
| $SiO_2$ | 63–65 |
| $Al_2O_3$ | 14–16 |
| MgO | 4–7 |
| CaO | 4–7 |
| $Li_2O$ | 2.2–3 |
| $TiO_2$ | 2–5 |
| $ZrO_2$ | 0.5–2 |
| ZnO | 2–4 |
| (MgO+CaO) | 9–12 |

3. The glass of claim 2, wherein the composition is of the range—

| Component: | Percent by weight |
|---|---|
| $SiO_2$ | 63–65 |
| $Al_2O_3$ | 14–16 |
| MgO | 5 |
| CaO | 5 |
| $Li_2O$ | 2.5–3 |
| $TiO_2$ | 4 |
| $ZrO_2$ | 1 |
| ZnO | 3 |

4. A method for making a partially crystalline ceramic article which comprises making a thermally crystallizable glass melt having a liquidus temperature below 2450° F. and consisting essentially of the following components present in the glass in the indicated percentage ranges—

| Component: | Percent by weight |
|---|---|
| $SiO_2$ | 60–66 |
| $Al_2O_3$ | 12–18 |
| MgO | 4–7 |
| CaO | 4–7 |
| $Li_2O$ | 1.5–4 |
| $TiO_2$ | 1.5–6 |
| $ZrO_2$ | 0.5–3 |
| ZnO | 2–5 |
| (MgO+CaO) | 8–13 | forming a glass article of predetermined size and shape from said glass melt, and thereafter thermally crystallizing said articles, by in situ crystallization, to a partially crystalline ceramic product having a lineal coefficient of thermal expansion in the range of $30$–$60 \times 10^{-7}/°$ C. over the range of 0 to 300° C., said ceramic product containing a multitude of substantially homogeneously dispersed crystals.

5. The method of claim 4, wherein said crystallizable glass is of the composition—

| Component: | Percent by weight |
|---|---|
| $SiO_2$ | 63–65 |
| $Al_2O_3$ | 14–16 |
| MgO | 4–7 |
| CaO | 4–7 |
| $Li_2O$ | 2.2–3 |
| $TiO_2$ | 2–5 |
| $ZrO_2$ | 0.5–2 |
| ZnO | 2–4 |
| (MgO+CaO) | 9–12 |

6. The method of claim 5, wherein said crystallizable glass is of the composition—

| Component: | Percent by weight |
|---|---|
| $SiO_2$ | 63–65 |
| $Al_2O_3$ | 14–16 |
| MgO | 5 |
| CaO | 5 |
| $Li_2O$ | 2.5–3 |
| $TiO_2$ | 4 |
| $ZrO_2$ | 1 |
| ZnO | 3 |

7. A partially crystalline ceramic having a lineal coefficient of thermal expansion in the range of $30$–$60 \times 10^{-7}/°$C. over the range of 0 to 300° C., and containing a multitude of substantially homogeneously dispersed crystals, said ceramic articles having been formed from a glass by thermal in situ crystallization, said glass being a thermally crystallizable glass having a liquidus temperature below 2450° F. and consisting essentially of the following components present in the glass in the indicated weight percentage ranges—

| Component: | Percent by weight |
|---|---|
| $SiO_2$ | 60–66 |
| $Al_2O_3$ | 12–18 |
| MgO | 4–7 |
| CaO | 4–7 |
| $Li_2O$ | 1.5–4 |
| $TiO_2$ | 1.5–6 |
| $ZrO_2$ | 0.5–3 |
| ZnO | 2–5 |
| (MgO+CaO) | 8–13 |

8. The partially crystalline ceramic of claim 7, wherein said thermally crystallizable glass is in the composition range—

| Component: | Percent by weight |
|---|---|
| $SiO_2$ | 63–65 |
| $Al_2O_3$ | 14–16 |
| MgO | 4–7 |
| CaO | 4–7 |
| $Li_2O$ | 2.2–3 |
| $TiO_2$ | 2–5 |
| $ZrO_2$ | 0.5–2 |
| ZnO | 2–4 |
| (MgO+CaO) | 9–12 |

9. The partially crystalline ceramic of claim 8, wherein said thermally crystallizable glass is in the composition range—

| Component: | Percent by weight |
|---|---|
| $SiO_2$ | 63–65 |
| $Al_2O_3$ | 14–16 |
| MgO | 5 |
| CaO | 5 |
| $Li_2O$ | 2.5–3 |
| $TiO_2$ | 4 |
| $ZrO_2$ | 1 |
| ZnO | 3 |

References Cited
UNITED STATES PATENTS

| | | | |
|---|---|---|---|
| 2,920,971 | 1/1960 | Stookey | 106—39 |
| 3,246,972 | 4/1966 | Smith | 106—39 |
| 3,252,811 | 5/1966 | Beall | 106—39 |
| 3,380,818 | 4/1968 | Smith | 106—39 |

HELEN M. McCARTHY, Primary Examiner

U.S. Cl. X.R.

65—33; 106—52